April 13, 1943.　　　F. W. BURGER　　　2,316,400
SLACK ADJUSTER
Filed Oct. 24, 1941　　　2 Sheets-Sheet 1

INVENTOR.
FREDERICK W. BURGER
BY Walter E. Schirmer
ATTORNEY

April 13, 1943.  F. W. BURGER  2,316,400
SLACK ADJUSTER
Filed Oct. 24, 1941  2 Sheets-Sheet 2

INVENTOR.
FREDERICK W. BURGER.
BY Walter E. Schirmer
ATTORNEY

Patented Apr. 13, 1943

2,316,400

UNITED STATES PATENT OFFICE 2,316,400

SLACK ADJUSTER

Frederick W. Burger, Niles, Mich., assignor to Clark Equipment Company, Buchanan, Mich., a corporation of Michigan Application October 24, 1941, Serial No. 416,297

6 Claims. (Cl. 188—18)

This invention relates to slack adjusters, and more particularly is directed to a slack adjuster mechanism arranged for adjusting the braking effort between a pair of brake drums respectively connected to an inboard and an outboard wheel of a dead trailer axle or similar non-driving axle.

The present invention is based upon a spindle end construction for trailer axles of this type, such as shown in detail in my copending application, Serial No. 362,757, filed October 25, 1940.

The present invention is particularly concerned with the provision of a slack adjuster for use in a trailer axle assembly shown in the copending application of Burton L. Mills, Serial No. 272,085, filed May 6, 1939, Patent No. 2,266,061, Dec. 12, 1941, in which there is provided an axle spindle having a pair of wheels mounted for relative rotation on the outboard end of the spindle with each of the wheels being connected to an individual brake drum, the two drums being axially spaced and being operated from the same brake cylinder or actuating means.

I have found that in such constructions there sometimes is a tendency for one brake to wear faster than the other, or due to manufacturing tolerances, the braking effort is unevenly distributed between the two brake drums. Consequently the present invention is directed to means for taking up the slack, as between the two brake operating means or shafts, so that the two brakes will operate equally to impart substantial uniform braking effort to each of the drums.

Other objects and advantages of the present invention will appear more fully from the following detailed description which, taken in conjunction with the accompanying drawings, will disclose to those skilled in the art the particular construction and operation of a preferred form of the present invention.

Figure 1:
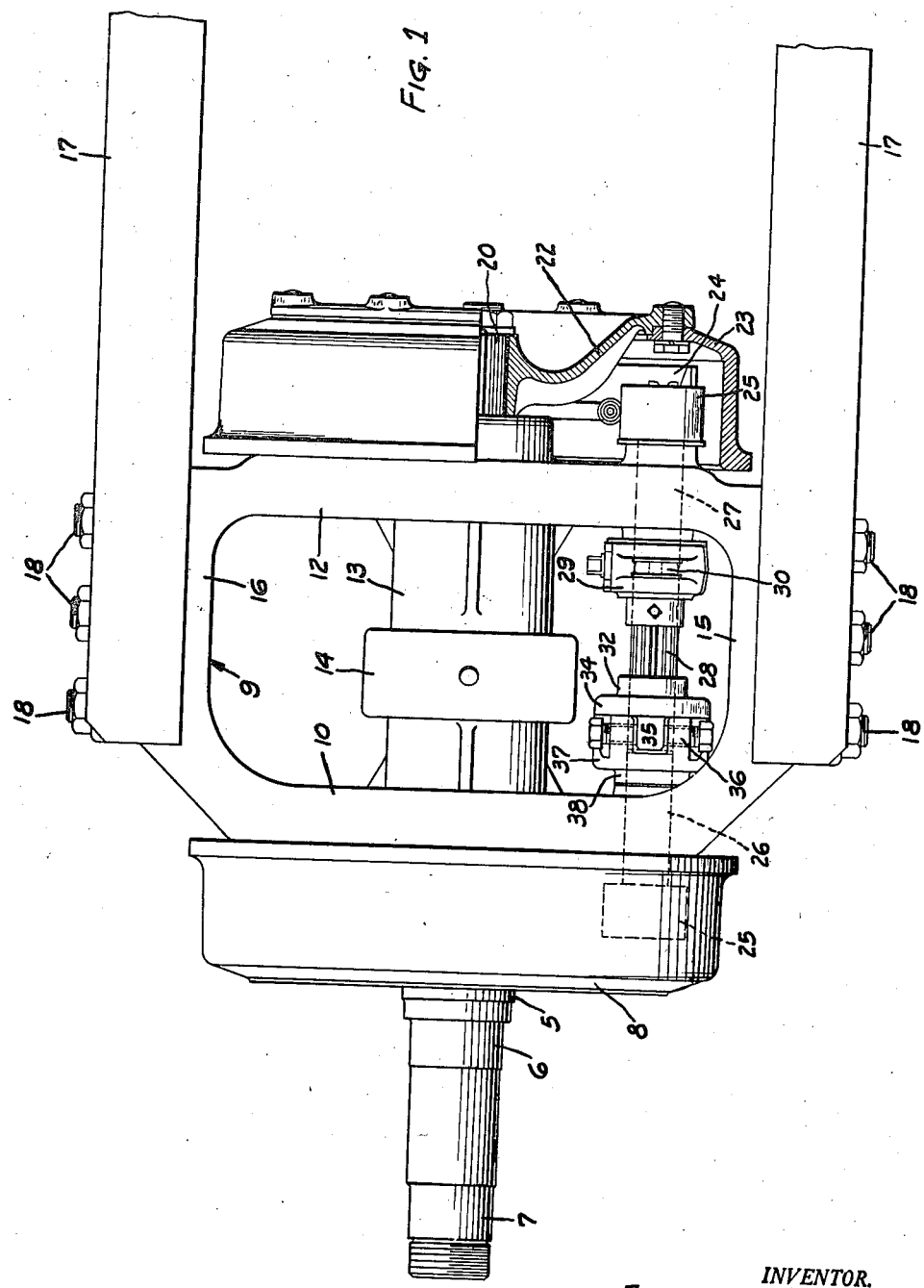
Figure 1 is a top plan view with portions broken away showing the slack adjuster as applied to such an axle.

Referring in detail to the drawings, while I have shown the slack adjuster mechanism as applied to one specific type of axle, it is to be understood that it could be equally well applied to other axle constructions of the dual wheel type.

In the drawings there is shown an axle spindle 5 having the bearing seats 6 and 7 upon which are rotatably mounted a pair of independent relatively rotatable wheels (not shown). The inboard wheel mounted on the bearing seat 6 is non-rotatably connected to the brake drum 8, which brake drum is disposed on the outboard side of a casting 9. The casting 9 is provided with two generally parallel web portions 10 and 12 extending transversely to the spindle 5, and with an intermediate sleeve portion 13 which is pressed over the spindle and non-rotatably secured thereto. The sleeve portion 13 is provided with the spring pad boss 14 adapted to receive a leaf spring assembly for supporting the axle from the frame of the trailer. At the outer ends of the web portions 10 and 12 there is provided connecting portions 15 and 16 which are so arranged as to receive the ends of transverse channel members 17, which are bolted thereto as by means of the studs 18. The opposite ends of the channels 17 are secured to a similar casting 9 supporting a similar wheel assembly at the opposite side of the vehicle.

Extending through the spindle 7 and rigidly connected at its outboard end to the outboard wheel is a shaft member 20, which is splined at its inboard end to receive the spider 22 carrying the brake drum 23 for the outboard wheel. This brake drum is thereby rotated conjointly with the outboard wheel, while the drum 8 is rotated conjointly with the inboard wheel.

Figure 2:
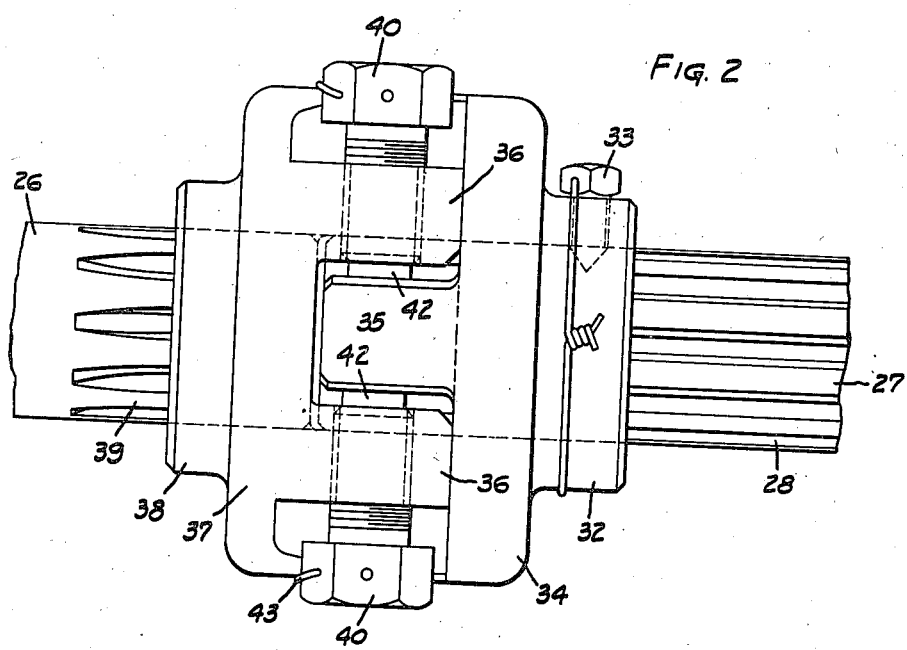
Figure 2 is an enlarged plan view of the adjuster mechanism.
Figure 3:
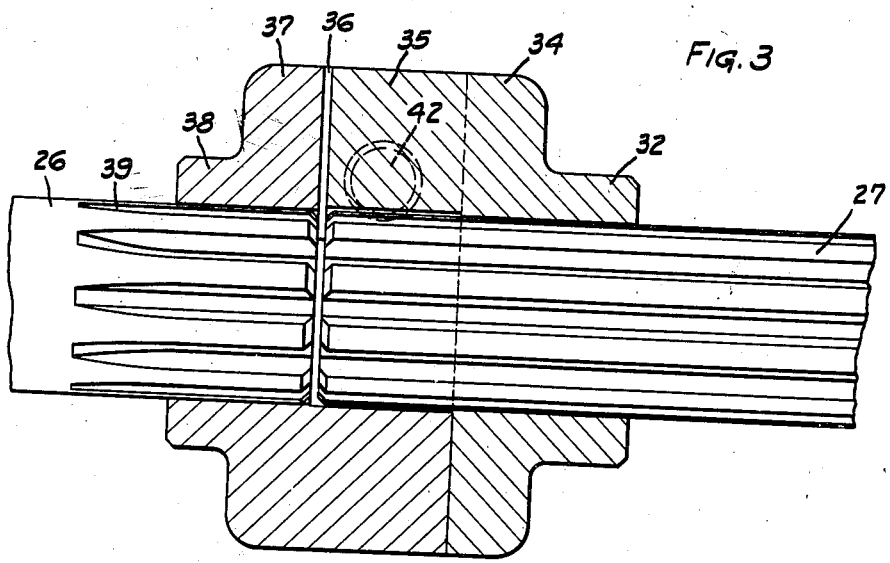
Figure 3 is a vertical sectional view through the mechanism.

Carried on the outer faces of the web portions 10 and 12 of the casting are suitable pairs of brake shoes, such as indicated at 24, and suitable actuating cams 25 are provided for spreading the shoes apart to impart braking effort to the brake drums 8 and 23. The actuating cams 25 are each provided with axially alined shaft portions 26 and 27 respectively, the shaft portion 27 being longer than the shaft portion 26 and being provided between the web portions 10 and 12 with the splined portion 28. Secured on the splined portion 28 of the shaft 27 is a suitable bracket member 29 having an extended arm portion 30, which is provided at its outer end with an eye (not shown) to which is connected the arm leading from the brake actuating cylinder for rocking the shaft 28 to actuate the cam 25. As is shown more clearly in Figures 2 and 3, the splined portion 28 of the shaft 27 is provided at its end with a flanged hub 32 non-rotatably secured to the end of the shaft 27 by the set screw 33.

The flange portion 34 of the hub 32 is provided with an axially extending lug or ear portion 35 which extends between two corresponding ears 36 carried by the flange portion 37 of a second hub portion 38 splined onto the end 39 of the shaft 26. The two ears 36 of the member 38 are spaced apart a distance slightly greater than the thickness of the ear 35 so that there is clearance therebetween. Each of the ears 36 carries a threaded stud 40, the two studs 40 being operable to move inwardly or outwardly relative the ears 36, and having abutting end portions 42 adapted to abut against opposite lateral faces of the ear 35. Thus, by tightening one of the studs 40 and loosening the other, the shaft 26 may be rotated relative to the shaft 27, thereby adjusting the position of the cam 25 on the shaft 26 relative to the cam 25 on the shaft 27. When rotated into proper position so that the brake means actuated by the two cams are arranged for equalized application of braking effort, the studs 40 are locked in position as by means of the lock wire 43, thereby locking the two shafts in predetermined angular position so that operation of the brake cylinder on the bracket 29 will result in simultaneous and equalized application of the cams to the brake shoes to provide uniform braking effort on the drums 8 and 23.

It will be apparent that as one or the other of the braking means wears, the adjustment may be changed by means of the studs 40 to accommodate this wear and to re-equalize the brakes for simultaneous operation. The two brackets 32 and 38 are of simplified construction, and may be readily applied to the shafts 26 and 27, it being apparent that if the wear becomes sufficiently great, one of the members may be removed from the shaft and replaced thereon in the next splined position so as to still render the slack adjuster operable for final adjustment of the brake operating means.

I am aware that changes may be made in the details of the present construction without in any way departing from the underlying principles of the present invention, and I therefore do not intend to be limited except as defined by the scope and spirit of the appended claims.

I claim:

1. The combination, with independent axially spaced brake means including arcuate brake shoes arranged to be spread apart by a cam, of axially alined shafts operable to rotate said cams and extending toward each other, said shafts having adjacent splined ends, slack adjusting collar members secured on said splined ends and having axially overlapping tongue and groove portions, and means on said portions for rotating one shaft relative to the other shaft.

2. Slack adjusting mechanism between the axially alined operating shafts of two brake applying mechanisms, said shafts having adjacent splined ends, comprising a first member having a hub portion splined on the end of one shaft and provided with an axially outwardly opening channel-like recess having parallel internal walls, a second member splined on the end of the other shaft and having an axially extending tongue portion disposed in said recess, and adjusting means carried by said first member for shifting said tongue portion laterally within said recess to thereby provide slight relative rotation between said shafts.

3. The combination, with a dual wheel construction including separate axially spaced brake drums for said wheels, of axially spaced brake means for said drums each including an actuating shaft, said shafts extending toward each other in axial alinement and having adjacent splined ends, mating coupling members on said ends of said shafts having axially projecting interengaging overlapping tongue and groove portions provided with predetermined circumferential clearance therebetween, and adjusting means for rotating one member relative to the other member within the limits of said clearance to vary the relation therebetween.

4. The combination of claim 3 further characterized in the provision of means on one of said shafts adapted to be connected to a brake applying mechanism for simultaneously rotating both shafts through said members.

5. The combination, with a dual wheel construction including separate axially spaced brake drums for said wheels, of axially spaced brake means for said drums each including an actuating shaft, said shafts extending toward each other in axial alinement and having adjacent splined ends, a first coupling member on one shaft end having a channel-shaped recess, a second coupling member on the other shaft end having a mating tongue portion projecting into said recess and having predetermined clearance, and stud means carried by said first member for locking said tongue portion in selected position in said recess.

6. In combination, a tubular spindle having a body member carried on the intermediate portion thereof, brake shoe supporting means on opposite ends of said body member including axially alined actuating shafts extending toward each other, a separate brake drum associated with each of said supporting means and adapted to be controlled by said brake shoes, coupling members on the adjacent ends of said shafts having axially overlapping tongue and groove receiving portions, adjusting means between said overlapping portions for varying the relative rotational position of said shafts and operable to lock them together for conjoint rotation in adjusted position, and means on one of said shafts adapted to be connected to a brake applying mechanism.

FREDERICK W. BURGER.